(12) United States Patent
Karve et al.

(10) Patent No.: US 11,016,900 B1
(45) Date of Patent: May 25, 2021

(54) LIMITING TABLE-OF-CONTENTS PREFETCHING CONSEQUENT TO SYMBOL TABLE REQUESTS

(71) Applicant: International Business Machines Corporation, Armonk, NY (US)

(72) Inventors: Mohit Karve, Austin, TX (US); Edmund Joseph Gieske, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/734,527

(22) Filed: Jan. 6, 2020

(51) Int. Cl.
*G06F 12/0897* (2016.01)
*G06F 12/0862* (2016.01)

(52) U.S. Cl.
CPC ...... *G06F 12/0862* (2013.01); *G06F 12/0897* (2013.01); *G06F 2212/221* (2013.01); *G06F 2212/305* (2013.01); *G06F 2212/602* (2013.01)

(58) Field of Classification Search
CPC .................................................. G06F 12/0862
USPC ........................................................ 711/122
See application file for complete search history.

(56) References Cited

U.S. PATENT DOCUMENTS

| | | | |
|---|---|---|---|
| 5,148,418 A | 9/1992 | Tsurushima | |
| 6,825,848 B1 * | 11/2004 | Fu | G06T 1/60 345/557 |
| 9,256,421 B2 | 2/2016 | Lin et al. | |
| 9,569,557 B2 | 2/2017 | Glazer et al. | |
| 2007/0112851 A1 * | 5/2007 | Tomic | G06F 40/226 |
| 2010/0191913 A1 * | 7/2010 | Chlipala | G06F 12/0866 711/122 |

OTHER PUBLICATIONS

"A Novel Data Pre-Fetch Method Under Heterogeneous Architecture", An IP.com Prior Art Database Technical Disclosure, Authors et. al.: Disclosed Anonymously, IP.com No. IPCOM000224167D, IP.com Electronic Publication Date: Dec. 12, 2012, 14 pages.

"System and Method to Improve Performance of an Application Using Smarter Pre-Fetching of Data Pages Based on Application Statistics", An IP.com Prior Art Database Technical Disclosure, Authors et. al.: Disclosed Anonymously, IP.com No. IPCOM000242961D, IP.com Electronic Publication Date: Sep. 3, 2015, 5 pages.

IBM, "A Method and System for Template-Based Data Pre-Fetching", An IP.com Prior Art Database Technical Disclosure, Original Publication Date: May 25, 2009, IP.com No. IPCOM000183493D, IP.com Electronic Publication Date: May 25, 2009, 7 pages.

* cited by examiner

*Primary Examiner* — Jae U Yu
(74) *Attorney, Agent, or Firm* — David B. Woycechowsky

(57) ABSTRACT

Technology for selectively prefetching data, such that less data is prefetched when it is determined that the requested data is located in logical addresses allocated to a symbol table data structure. In some embodiments, data is still prefetched when the request is directed to the symbol table, but the amount of data prefetched (measured in memory lines, bytes or other unit) is decreased relative to what it otherwise would be in the context of a non-symbol-table request. In other embodiments, prefetching is simply not performed at all when the request is directed to the symbol table.

18 Claims, 3 Drawing Sheets

LIMITING TABLE-OF-CONTENTS PREFETCHING CONSEQUENT TO SYMBOL TABLE REQUESTS

BACKGROUND

Cache prefetching is a technique used by computer processors to boost execution performance by fetching instructions or data from their original storage in slower memory to a faster local memory before it is actually needed (hence the term "prefetch"). Most modern computer processors have fast and local cache memories in which prefetched data is held until it is required. The source for the prefetch operation is usually main memory. Because of their design, accessing cache memories is typically much faster than accessing main memory, so prefetching data and then accessing it from caches (see definition of "cache," as the term is used in this document, below, in the Definitions section) is usually many orders of magnitude faster than accessing it directly from main memory.

A cache miss is a failed attempt to read or write a piece of data in the cache, which results in a main memory access with much longer latency. There are three kinds of cache misses: instruction read miss, data read miss, and data write miss.

Cache read misses from an instruction cache generally cause the largest delay, because the processor, or at least the thread of execution, has to wait (stall) until the instruction is fetched from main memory. Cache read misses from a data cache usually cause a smaller delay, because instructions not dependent on the cache read can be issued and continue execution until the data is returned from main memory, and the dependent instructions can resume execution. Cache write misses to a data cache generally cause the shortest delay, because the write can be queued and there are few limitations on the execution of subsequent instructions; the processor can continue until the queue is full.

As of 21 Nov. 2019, the Wikipedia entry for "symbol table" states, in part, as follows: "In computer science, a symbol table is a data structure used by a language translator such as a compiler or interpreter, where each identifier (a.k.a. symbol) in a program's source code is associated with information relating to its declaration or appearance in the source. In other words, the entries of a symbol table store the information related to the entry's corresponding symbol. . . . A symbol table may only exist in memory during the translation process, or it may be embedded in the output of the translation, such as in an ABI object file for later use. For example, it might be used during an interactive debugging session, or as a resource for formatting a diagnostic report during or after execution of a program. . . . The minimum information contained in a symbol table used by a translator includes the symbol's name, its relocatability attributes (absolute, relocatable, etc.), and its location or address. For relocatable symbols, some relocation information must be stored. Symbol tables for high-level programming languages store the symbol's type: string, integer, floating-point, etc., its size, and its dimensions and its bounds. Not all of this information is included in the output file, but may be provided for use in debugging. In many cases, the symbol's cross-reference information is stored with or linked to the symbol table. Most compilers print some or all of this information in symbol table and cross-reference listings at the end of translation. . . . Numerous data structures are available for implementing tables. Trees, linear lists and self-organizing lists can all be used to implement a symbol table. The symbol table is accessed by most phases of a compiler, beginning with lexical analysis, and continuing through optimization. A compiler may use one large symbol table for all symbols or use separated, hierarchical symbol tables for different scopes. . . . A common data structure used to implement symbol tables is the hash table. The time for searching in hash tables is independent of the number of elements stored in the table, so it is efficient for a large number of elements."

SUMMARY

According to an aspect of the present invention, a computer implemented method, system and/or computer program product, for use a computer having a processor(s) set, a first-level storage device and a second-level storage device, with the first-level storage device being more operationally proximate to the processor(s) set than is the second-level storage device, performs the following operations (not necessarily in the following order): (i) instantiating and beginning to run a computer program, with the instantiation and running including storing a symbol table data structure for the computer program in the second-level storage device; (ii) receiving a request to fetch requested data from the second-level storage device down to the first-level storage device; (iii) responsive to the receipt of the request, determining that the requested data includes data from the symbol table data structure; (iv) responsive to the determination that the requested data includes data from the symbol table data structure, determining an amount X of data to prefetch in response to the request, with the amount X being less than an amount Y of data that would be prefetched if the starting logical address was not within the series of consecutive logical addresses of the symbol table data structure; and (v) further responsive to the receipt of the request, fetching, from the second-level storage device down to the first-level storage device, the following: (i) the requested data, and (ii) the amount X of data stored consecutively after the requested data.

According to a further aspect of the present invention, a computer implemented method, system and/or computer program product, for use a computer having a processor(s) set, a first-level storage device and a second-level storage device, with the first-level storage device being more operationally proximate to the processor(s) set than is the second-level storage device, performs the following operations (not necessarily in the following order): (i) instantiating and beginning to run a computer program, with the instantiation and running including storing a symbol table data structure for the computer program in the second-level storage device; (ii) receiving a request to fetch requested data from the second-level storage device down to the first-level storage device; (iii) responsive to the receipt of the request, determining that the requested data includes data from the symbol table data structure; (iv) responsive to the determination that the requested data includes data from the symbol table data structure, turning off a prefetch operation for purposes of responding to the request; and (v) further responsive to the receipt of the request, fetching, from the second-level storage device down to the first-level storage device the requested data without prefetching any additional data.

According to a further aspect of the present invention, a computer implemented method, system and/or computer program product, for use a computer having a processor(s) set, a first first-level storage device in the form of a first cache, a second first-level storage device in the form of a second cache, and a second-level storage device, with the first-level storage devices being more operationally proximate to the processor(s) set than is the second-level storage device, performs the following operations (not necessarily in the following order): (i) instantiating and beginning to run a computer program, with the instantiation and running including storing a symbol table data structure for the computer program in the second-level storage device; (ii) receiving a request to fetch requested data from the second-level storage device down to the first-level storage device; (iii) responsive to the receipt of the request, determining that the requested data includes data from the symbol table data structure; (iv) responsive to the determination that the requested data includes data from the symbol table data structure, determining that data should be prefetched to the second first-level cache, rather than the first first-level cache; and (v) further responsive to the receipt of the request, prefetching data from the second-level storage device to the second first-level cache.

DETAILED DESCRIPTION

Figure 1:
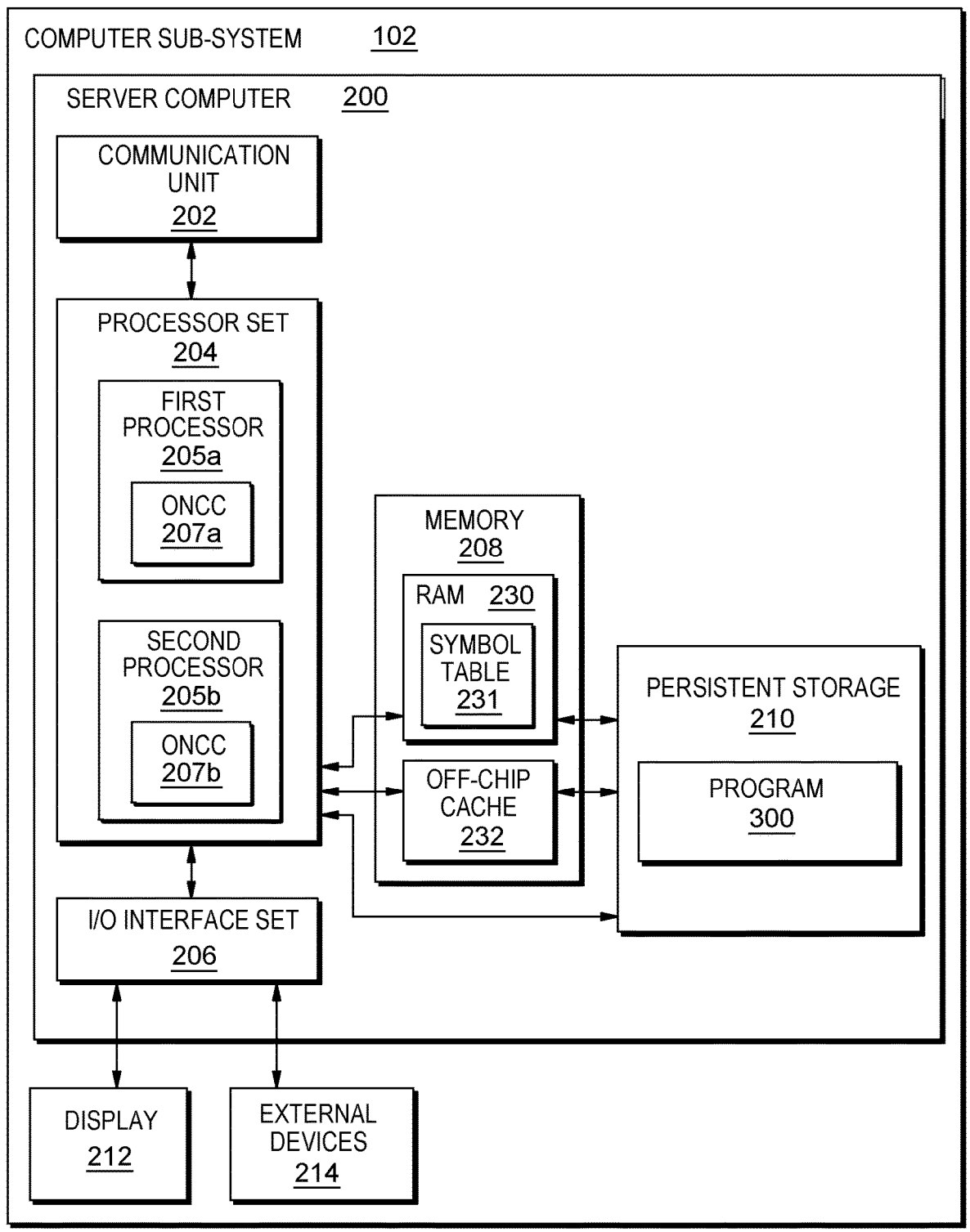
FIG. 1 is a block diagram view of a first embodiment of a system according to the present invention.

Some embodiments of the present invention are directed to selectively prefetching data, such that less data is prefetched when it is determined that the requested data is located in logical addresses allocated to a symbol table data structure. In some embodiments, data is still prefetched when the request is directed to the symbol table, but the amount of data prefetched (measured in memory lines, bytes or other unit) is decreased relative to what it otherwise would be in the context of a non-symbol-table request. In other embodiments, prefetching is simply not performed at all when the request is directed to the symbol table. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of computer sub-system 102, including: computer 200; communication unit 202; processor set 204; input/output (I/O) interface set 206; memory device 208; persistent storage device 210; display device 212; external device set 214; random access memory (RAM) 230 (which includes stored in a single table 231); off-chip cache 232; and program 300. Processor set 204 includes: first processor 205a (including on-chip cache 207a); and second processor 205b (including on-chip cash 207b).

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
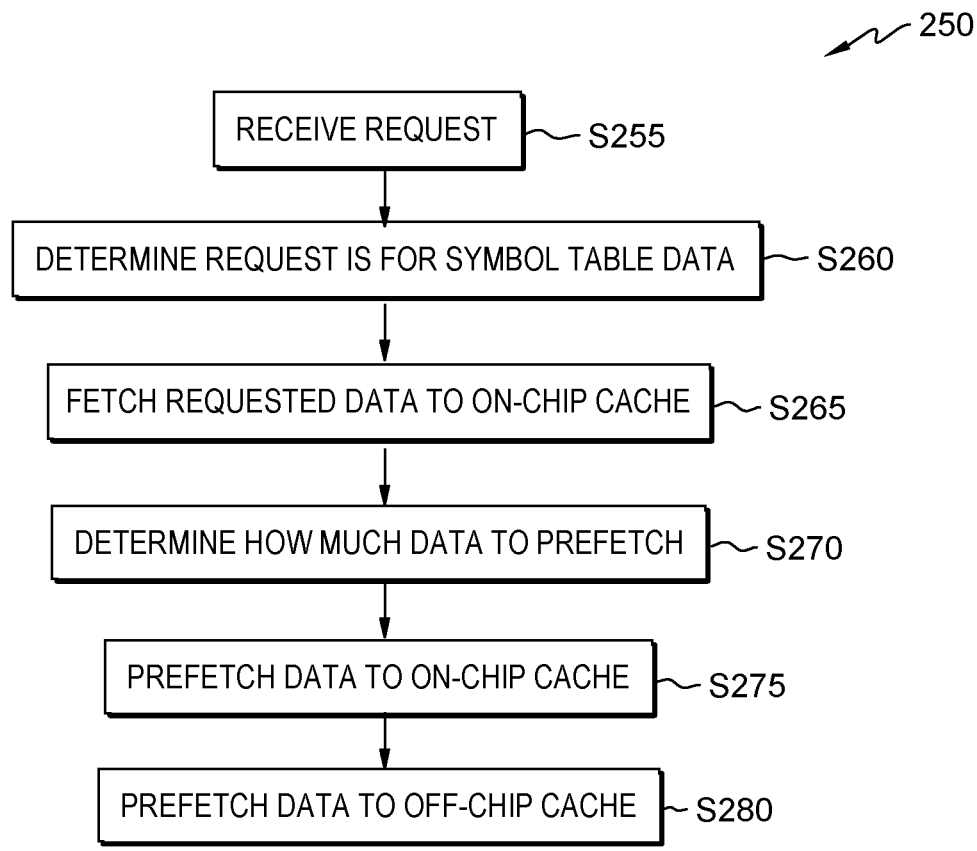
FIG. 2 is a flowchart showing a first embodiment method performed, at least in part, by the first embodiment system.
Figure 3:
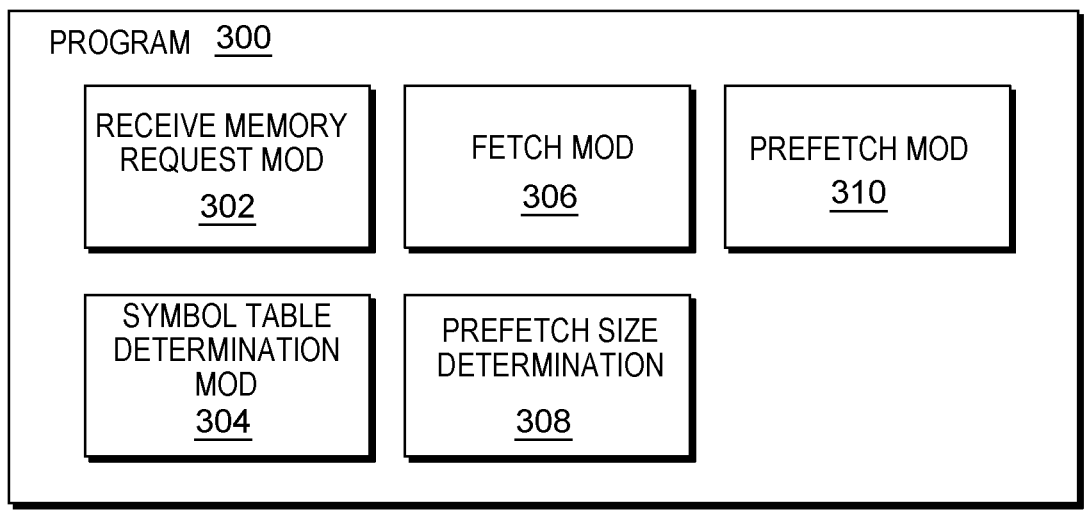
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive memory request module ("mod") 302 receives a request to fetch data from RAM 230 to second processor 205*b*. At this early juncture in the process, it is not known whether this request is requesting data from symbol table 231 that is stored in RAM 230 or, alternatively, whether this is a request for other data stored in RAM 230.

Processing proceeds to operation S260, where symbol table determination mod 304 determines whether the request is a request for symbol table data or non-symbol-table data, based upon whether the logical addresses of the requested data, specified by the request, match logical addresses corresponding to symbol table 231 stored in RAM 232. In this example of flowchart 250, it is determined that the request does indeed request symbol table data. As will be discussed in detail in the following subsection of this Detailed Description section, there are other ways for determining whether a given request is directed to the symbol table, such as by using a determination as to whether the requested data is in an R2 register.

An excerpt of the information stored in symbol table 231 is as follows:

U closedir@@GLIBC_2.0
U dlclose@@GLIBC_2.0
U dlerror@@GLIBC_2.0
. . .
U strtol@@GLIBC_2.0
U _xstat@@GLIBC_2.0
08048a50 T _init
08048cd8 T _start
08048cfc t call_gmon_start
08048d20 t _do_global_dtors_aux
08048d54 t frame_dummy
08048d80 T main
080491a0 T getProgramPath
080491aa t findProgram
. . .
0804c89c b saveArgv
0804c8a0 A _end The leftmost column of symbol table 231 is the memory address of the function or global variable in the rightmost column. The first few entries do not have an address because they are dynamically linked functions that are in standard (or user defined) libraries, for example printf which is included in stdio.h (part of glibc). Pointers to these functions will be dynamically provided by the operating system at runtime, they are not a known feature of a given program. The following entries are pointers to functions and variables in the compiled binary. First column tells us where the matching symbol is stored e.g. the function 'main' begins at 08048d80; the variables _bss_start, completed.1 and _edata have the same value, which is stored at 0804c868. The middle column tells us the type of the symbol, T is usually the name of a function, A is a constant, etc. (the manual page for the nm command on a linux system has more information). The addresses are not regular because it's just a listing of where the symbols are in the binary. For variables there may be some regularity, but functions have no specific sizes and hence will be spaced at unpredictable intervals. In this embodiment of symbol table 231, the table itself is stored in contiguous memory. The thrust of our patent is that there is no reason to expect that the location of the function _start will be desired right after the location of the function _init is requested. As such, there is no reason to prefetch large chunks of the symbol table into the cache hierarchy because dynamic execution will require (for example) the functions init, stat, loadLibrary, followed by reads on the variables _finit_array_end, edata, p.0, gtk and _data_start, followed by function calls to _loadGtk and unloadLibrary. These accesses may be spaced hundreds or thousands of cycles apart. As there is no discernible pattern in terms of addresses accessed in the table, there is no reason to pollute the caches by prefetching small chunks of the table that are in cache lines immediately following an actually requested symbol. Recognizing that a load is being made to the symbol table (table of contents in IBM terminology) allows us to prevent this wasteful prefetching and also conserve power and memory bandwidth.

Figure 4:
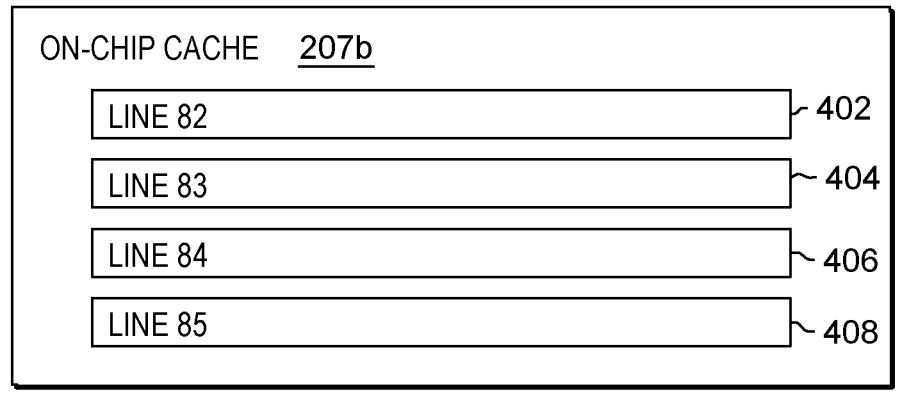
FIG. 4 is a block diagram showing a portion of the first embodiment system.

Processing proceeds to operation S265, where the requested symbol table data is fetched from RAM 232 on-chip cache 207*b* of the second processor 205*b* by fetch mod 306. In this example, this fetching operation is performed in a conventional manner. In this example, the requested portion of the symbol table are lines 82 and 83. As shown in FIG. 4, line 82 (designated by reference 402) and line 83 (designated by reference 404) are shown after they have been fetched to on-chip cache 207*b*.

Figure 5:
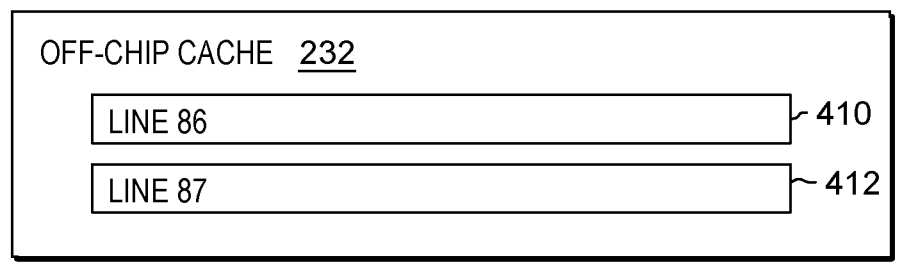
FIG. 5 is a block diagram showing a portion of the first embodiment system.

Processing proceeds to operation S270, where prefetch size determination mod 308 determines how much data (likely symbol table data) to prefetch. In this particular example, mod 308 is programmed so that: (i) one quarter of the amount of data normally prefetched for non-symbol-table-requests is prefetch to be applicable on-chip cache; and (ii) one quarter of the amount of data normally prefetched for non-symbol-table requests is prefetched to the off-chip cache 232. Furthermore, in this particular example, eight (8) lines of data, above and beyond what has been requested is normally prefetched for non-symbol-table requests. This means that, in this example: (i) two lines of symbol table data (specifically, lines 84 and 85) are prefetched to on-chip cache 207b (this is shown by line 406 and line 408 in FIG. 4); and (ii) two (2) lines of symbol table data (specifically, lines 86 and 87) are prefetched to off-chip cache 232 (this is shown by line 410 and line 412 in FIG. 5).

An important thing to note for purposes of better understanding the potential scope of the present invention is that less data is prefetched, then normally would be prefetched, because the prefetching is done in response to a request for data in the symbol table. In some embodiments, this may mean that no prefetching is done in connection with symbol to table data requests. In this embodiment, some data is still prefetched, but only four (4) lines as opposed to the eight (8) lines that would normally be prefetched for non-symbol-table data.

In this embodiment, the eight (8) lines of data that is prefetched for non-symbol table data is sent to the applicable on-chip cache 207a,b, rather than off-chip cache 232. However, when the requested data is determined to be part of the symbol table, then some of the prefetched and cached data goes instead to off-chip cache 232. This illustrates the concept that some embodiments of the present invention may change the identity of the cache(s) used when the requested data is symbol table data. In these embodiments, the data would still go to a cache that is more logically proximate to the processor(s) set (sometimes herein called a "first-level storage device") than the location where the symbol table is stored (sometimes herein referred to as a "second-level storage device").

For a better understanding of what "cache" means in the context of this document, please see the definition of "cache," below, in the Definitions section. On-chip cache 207b and off-chip cache 232 are examples of what is sometimes referred to herein as a "first-level storage device," and RAM 230 is an example of what is sometimes referred to herein as a "second-level storage device." Regardless of the physical form and logical location of a storage device, the idea is that, in a given computer system, any first-level storage devices will be logically more proximate to the processor then will be any second-level storage devices.

Processing proceeds to operation S275, where prefetch mod 310 prefetches the two lines of symbol table data 406 and 408, RAM 230 to on-chip cache 207b, as discussed in the preceding paragraphs and shown in FIG. 4.

Processing proceeds to operation S280, where prefetch mod 310 prefetches the two lines of symbol table data 410 and 412, from symbol table 231 of RAM 230 to off-chip cache 232, as discussed in the preceding paragraphs and shown in FIG. 4.

III. Further Comments and/or Embodiments

Some embodiments of the present invention recognize the following facts, potential problems and/or potential areas for improvement with respect to the current state of the art: (i) The Table of Contents (TOC) is a specially designated memory range that is reserved for storing global symbols for a program; (ii) on the AIX (advanced interactive executive) operating system, the TOC is limited to 64 kilobytes of memory, and so can store 8192 global variables in 64-bit mode; (iii) global variables are frowned upon in the software engineering community due to security reasons so there tend to be relatively few such variables in any given program; (iv) conventional stream prefetchers tend to start prefetching sequentially from any cache miss. This is not the ideal strategy for TOC accesses because the TOC is rarely accessed in a streaming pattern; (v) normal prefetchers would end up overprefetching, wasting memory bandwidth and cache space; and/or (vi) the table of contents (also sometimes referred to the "symbol table") contains information about all declared global variables in the program, and the symbol table is therefore rarely accessed in a sequential manner.

Some embodiments of the present invention may include one, or more, of the following features, advantages, characteristics and/or advantages: (i) introduce a way to flag TOC accesses and control the number of prefetches sent to achieve good performance without cache pollution and excessive bandwidth consumption; (ii) POWER (performance optimization with enhanced RISC (reduced instruction set computer)) processors reserve the register R2 for storing the base address of the TOC pointer; (iii) at the high level, some embodiments will react to this information and limit the depth of a generated prefetch stream; and/or (iv) recognizes that a load is being made to the TOC/Symbol Table of the program, and that the amount of prefetched data should be reduced in this situation because it is highly unlikely that the prefetch will actually be consumed.

In some embodiments of the present invention, loads that use R2 as the base register (on the POWER ISA (industry standard architecture)) are known to be accessing the Table of Contents. By convention, the compiler will store the base address of the TOC in R2 and all future accesses to the TOC will simply be offset from R2. The TOC is used to store global variables. Modern programming practices do not favor the use of many global variables, thus the TOC is likely to be fairly small to begin with. Beyond that, it is unlikely that any program will attempt to read/write many values in the TOC in close temporal proximity (except perhaps during initialization of the program). Some embodiments capitalize on this knowledge to increase the accuracy of data prefetching.

In some embodiments of the present invention, when the prefetcher observes a load that uses R2 as its base, it flags the load as a TOC access. If this load is a cache hit, no new stream is allocated. It may hit an existing prefetch stream and count as a confirm. If this load is a cache miss, the prefetcher will deallocate the LRU (least recently used) entry in the PRQ (prefetch request queue) and allocate a new PRQ entry for the incoming load. This PRQ entry will be marked as a TOC entry and will not be allowed to increase its request depth beyond two lines. Where one confirm to a normal PRQ entry would result in a total depth of 6 lines, a TOC PRQ stream will only go two lines ahead. If only a few more confirms are seen, a normal PRQ entry will keep going deeper until it is 16-20 lines ahead. A TOC PRQ entry will always stay only two lines ahead. This will ensure that we do not overprefetch the TOC.

Further, in some embodiments of the present invention, a set of thread specific counter(s) tracks how many: (i) TOC prefetches are sent, and (ii) how many TOC prefetches are consumed. This kind of tracking is a feature that already exists on some currently available products and/or services. If this counter suggests that TOC prefetches are not being used, the prefetcher will stop allocating TOC PRQ entries entirely. In the event that there is no streaming behavior associated with TOC accesses for a given software thread, the prefetcher will thus adaptively disable allocation for TOC loads. Not only does this stop unnecessary prefetches completely, it also prevents deallocation of a potentially useful normal PRQ entry. In order to prevent lockout of all future TOC accesses, the counter is periodically reset to allow a few TOC accesses to allocate in the PRQ. If the thread is still averse to TOC prefetching, TOC allocates will be quickly disallowed again. If something has changed, TOC allocates will continue to be allowed as long as the prefetches are used.

As an alternative embodiment of the system set forth in the previous paragraph, the programmer has determined that R2 should be used to access prefetchable non-TOC sections of memory. This modification to embodiment of the previous paragraph can easily be made by reverting to 'normal' prefetching if the utilization counter is very high.

In some embodiments of the present invention, this approach to special handling of TOC accesses reduces bad prefetches while making more resources in the PRQ, caches and memory subsystem available to actual streaming accesses.

Some embodiments of the present invention may include one, or more, of the following features, characteristics and/or advantages: (i) utilizes data prefetching; (ii) is a hardware technique; (iii) identifies the Table of Contents; (iv) uses the knowledge of a compiler Table of Contents to perform prefetch; (v) the program TOC is generated by a compiler; (vi) utilizes information about the Table of Contents to reduce prefetching; (vii) utilizes the compiler Table of Contents to perform specific actions; (viii) utilizes a microprocessor to perform data prefetch; (ix) is orthogonal; (x) utilizes TOC based throttling of data prefetching; and (xi) in a computer system, system management to prevent over-utilization of data cache resources for fetches to a Table of Contents, wherein load instructions (that access the Table of Contents) are detected by a processor core in the computer system to restrict the number of data prefetches associated with that access, and wherein a counter tracks the Table of Contents prefetch utilization and can dynamically disable and enable.

Some embodiments of the present invention may include one, or more, of the following features, characteristics and/or advantages: (i) the usage of the register R2 for TOC accesses is compiler convention, but not enforced; (ii) this means that the determination that a given request is a request for symbol table data is based on an assumption that requested data in the R2 register is indeed data from the symbol table; (iii) there may be cases where R2 refers to the data structures that are prefetchable; (iv) there may also be embodiments that want to access a block of sequential lines in the TOC; (v) system only accesses random entries in the TOC and performs no prefetching; (vi) uses more than one line in the TOC in a small time window, and thus want to prefetch a little bit (as discussed above in the embodiment of subsection II of this Detailed Disclosure section); and/or (vii) the programmer is using R2 to access prefetchable non-TOC sections of memory.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Cache: any memory, or portion of a memory, that is logically more proximate to the processor(s) set than the storage where a "symbol table" (see definition in The background section) is stored, regardless of whether the memory is nominally designated as a "cache" by those of skill in the art; for purposes of this document, there are 2 types of cache: on-chip cache (located one, or more, of the processor(s) of the processor(s) set of the computer) and off-chip cache.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use a computer having a processor(s) set, a first-level storage device and a second-level storage device, with the first-level storage device being more operationally proximate to the processor(s) set than is the second-level storage device, the CIM comprising:

instantiating and beginning to run a computer program, with the instantiation and running including storing a symbol table data structure for the computer program in the second-level storage device;

receiving a request to fetch requested data from the second-level storage device down to the first-level storage device;

responsive to the receipt of the request, determining that the requested data includes data from the symbol table data structure;

responsive to the determination that the requested data includes data from the symbol table data structure, determining an amount X of data to prefetch in response to the request, with the amount X being less than an amount Y of data that would be prefetched if the starting logical address was not within the series of consecutive logical addresses of the symbol table data structure; and further responsive to the receipt of the request, fetching, from the second-level storage device down to the first-level storage device, the following: (i) the requested data, and (ii) the amount X of data stored consecutively after the requested data.

2. The CIM of claim 1 wherein:
the first-level storage device is a cache memory built into the processor(s) set as an on-chip cache; and
the second-level storage device is a random access memory.

3. The CIM of claim 1 wherein the determination that the requested data includes data from the symbol table data structure includes:
determining that the starting logical address is within a register in the second-level storage device that is used to store the symbol table.

4. The CIM of claim 3 wherein the register is an R2 register.

5. The CIM of claim 1 wherein:
X is measured in units of lines of memory; and
Y is measured in units of lines of memory.

6. The CIM of claim 1 wherein:
X is measured in units of bytes of data; and
Y is measured in units of bytes of data.

7. A computer-implemented method (CIM) for use a computer having a processor(s) set, a first-level storage device and a second-level storage device, with the first-level storage device being more operationally proximate to the processor(s) set than is the second-level storage device, the CIM comprising:
instantiating and beginning to run a computer program, with the instantiation and running including storing a symbol table data structure for the computer program in the second-level storage device;
receiving a request to fetch requested data from the second-level storage device down to the first-level storage device;
responsive to the receipt of the request, determining that the requested data includes data from the symbol table data structure;
responsive to the determination that the requested data includes data from the symbol table data structure, turning off a prefetch operation for purposes of responding to the request; and
further responsive to the receipt of the request, fetching, from the second-level storage device down to the first-level storage device the requested data without prefetching any additional data.

8. The CIM of claim 7 wherein:
the first-level storage device is a cache memory built into the processor(s) set as an on-chip cache; and
the second-level storage device is a random access memory.

9. The CIM of claim 7 wherein the determination that the requested data includes data from the symbol table data structure includes:
determining that the starting logical address is within a register in the second-level storage device that is used to store the symbol table.

10. The CIM of claim 9 wherein the register is an R2 register.

11. The CIM of claim 7 wherein the prefetch feature, when operative, prefetches Y lines of memory, with Y being an integer greater than zero.

12. The CIM of claim 7 wherein the prefetch feature, when operative, prefetches Y bytes of data, with Y being an integer greater than zero.

13. A computer-implemented method (CIM) for use a computer having a processor(s) set, a first first-level storage device in the form of a first cache, a second first-level storage device in the form of a second cache, and a second-level storage device, with the first and second first-level storage devices being more operationally proximate to the processor(s) set than is the second-level storage device, the CIM comprising:
instantiating and beginning to run a computer program, with the instantiation and running including storing a symbol table data structure for the computer program in the second-level storage device;
receiving a request to fetch requested data from the second-level storage device down to the first-level storage device;
responsive to the receipt of the request, determining that the requested data includes data from the symbol table data structure;
responsive to the determination that the requested data includes data from the symbol table data structure, determining that data should be prefetched to the second first-level cache, rather than the first first-level cache; and
further responsive to the receipt of the request, prefetching data from the second-level storage device to the second first-level storage device in the form of the second cache.

14. The CIM of claim 13 wherein:
the first-level storage device is a cache memory built into the processor(s) set as an on-chip cache; and
the second-level storage device is a random access memory.

15. The CIM of claim 13 wherein the determination that the requested data includes data from the symbol table data structure includes:
determining that the starting logical address is within a register in the second-level storage device that is used to store the symbol table.

16. The CIM of claim 15 wherein the register is an R2 register.

17. The CIM of claim 13 wherein:
the first first-level cache is an on-chip cache; and
the second first-level cache is an off-chip cache.

18. The CIM of claim 13 wherein:
the second first-level cache is an on-chip cache; and
the first first-level cache is an off-chip cache.

* * * * *